(12) United States Patent
Petrok et al.

(10) Patent No.: US 7,004,699 B2
(45) Date of Patent: Feb. 28, 2006

(54) QUICK ASSEMBLY FASTENING SYSTEM FOR PLASTIC PARTS

(75) Inventors: Christopher J. Petrok, Waterbury, CT (US); Gregory A. Wind, Killingworth, CT (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/962,895

(22) Filed: Sep. 25, 2001

(65) Prior Publication Data

US 2003/0059272 A1    Mar. 27, 2003

(51) Int. Cl.
  *F16B 33/00*    (2006.01)
(52) U.S. Cl. ..................... 411/366.1; 411/82
(58) Field of Classification Search ............ 411/366.1, 411/366.2, 82, 180, 107, 437, 433, 301, 338; 403/408.1, 359.1
See application file for complete search history.

(56) References Cited

U.S. PATENT DOCUMENTS

| | | | | |
|---|---|---|---|---|
| 3,346,032 A | * | 10/1967 | Gulistan | ..................... 411/349 |
| 4,282,610 A | * | 8/1981 | Steigerwald et al. | ........... 2/414 |
| 4,435,111 A | * | 3/1984 | Mizusawa | ................... 411/437 |
| 4,577,402 A | * | 3/1986 | Swanstrom | ................... 29/840 |
| 4,770,582 A | | 9/1988 | Junemann et al. | |
| 4,952,107 A | * | 8/1990 | Dupree | ....................... 411/103 |
| 5,017,068 A | * | 5/1991 | Cooksey | ..................... 411/373 |
| 5,054,163 A | * | 10/1991 | Sterling et al. | ............... 16/244 |
| 5,290,131 A | * | 3/1994 | Henriksen | ................... 411/180 |
| 5,395,196 A | | 3/1995 | Notaro | |
| 5,409,323 A | | 4/1995 | Greene | |
| 5,697,744 A | * | 12/1997 | Medal | ......................... 411/82 |
| 6,170,858 B1 | * | 1/2001 | Berger | ..................... 280/728.2 |
| 6,171,041 B1 | | 1/2001 | Bazinski et al. | |
| 6,174,117 B1 | | 1/2001 | Kawatani et al. | |
| 6,202,223 B1 | | 3/2001 | Chartrand | |
| 6,244,073 B1 | * | 6/2001 | Kaping, Jr. | ..................... 63/12 |
| 6,394,724 B1 | * | 5/2002 | Kelly et al. | ................. 411/353 |

FOREIGN PATENT DOCUMENTS

| | | |
|---|---|---|
| DE | 7925469 | 12/1979 |
| DE | 29614832 U1 * | 1/1997 |
| DE | 198 16 672 | 11/1998 |
| EP | 0325069 | 7/1989 |
| EP | 1004782 | 5/2000 |
| GB | 1457517 | 12/1976 |
| WO | PCT/US/30234 | 9/2002 |

* cited by examiner

*Primary Examiner*—William L. Miller
(74) *Attorney, Agent, or Firm*—Ajay K. Gambhir; Edward O. Murphy; Richard J. Veltman

(57) ABSTRACT

A fastening system for connecting plastic members to each other via a metal stud having a head and a shaft. The plastic members include a plastic member and a plastic parent member. The plastic parent member is affixed to a head of the metal stud. The shaft of the metal stud is disposed in the plastic member wherein a plastic clip is forced onto to be connected upon the threads of the shaft of the metal stud, from which connection the plastic clip is rotatively removable. Of course, the plastic clip could be formed integrally with the plastic member, and the plastic member could be adapted to carry, or have connected thereto, additional components.

9 Claims, 4 Drawing Sheets

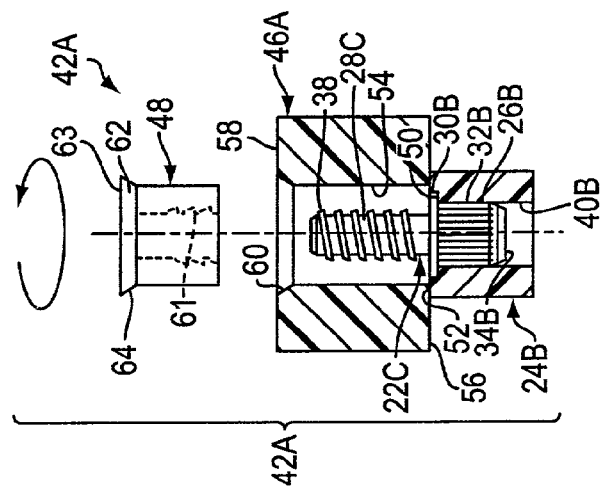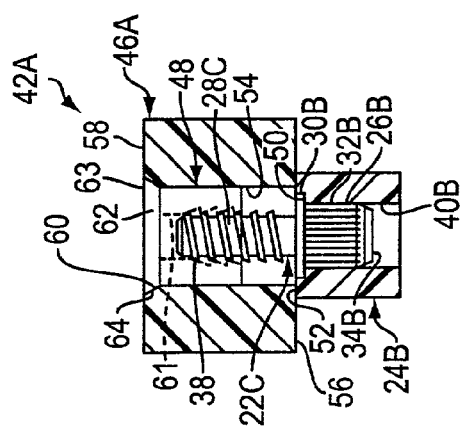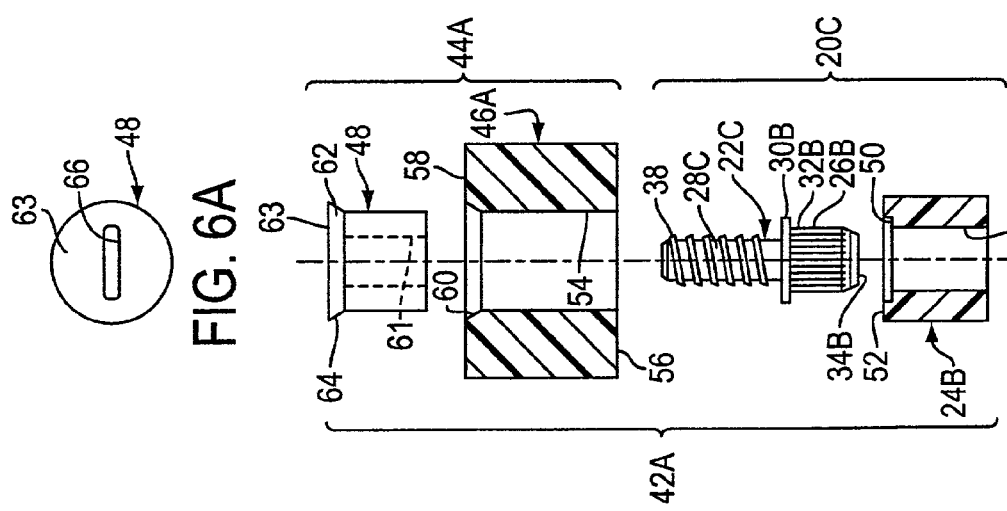

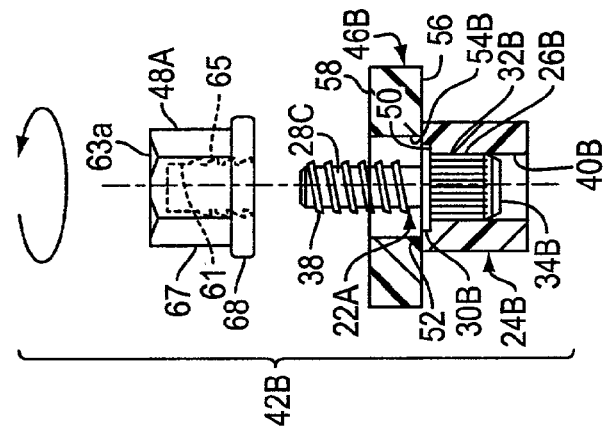
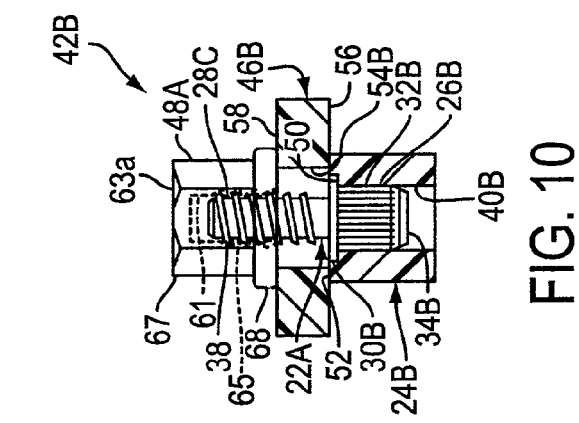
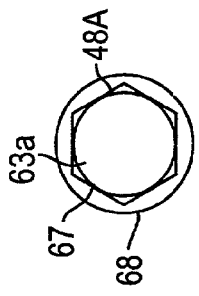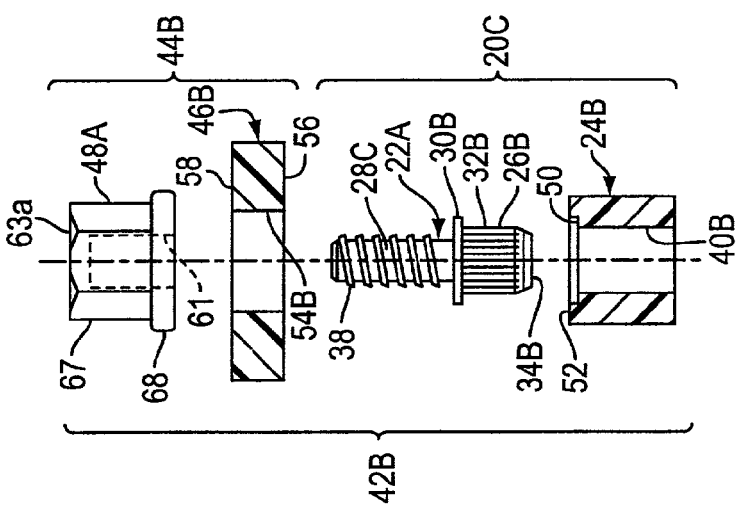

QUICK ASSEMBLY FASTENING SYSTEM FOR PLASTIC PARTS

BACKGROUND OF THE INVENTION

The present invention relates to a fastening system, in particular to a fastening system in which a metal stud is used to join one or more plastic parts to each other the final assembly completed with a simple push-on interconnection. Subsequent disconnects may be rotatively made.

The prior art fastening systems required complex interconnection between the metal and the plastic parts, such as crimping or the like. This required expensive and bulky equipment and the necessary space for the equipment. Also, it made disconnection difficult or impossible, whereby the parts were not readily reusable thereafter.

SUMMARY OF THE PRESENT INVENTION

Accordingly, it is a primary object of the present invention to provide a fastening system for plastic parts that is quick to assemble and can easily be disassembled and is reusable. Another object of the present invention is to use a metal stud that is connectable to join plastic parts to itself and each other without distorting the metal stud. It is still another object of the invention to provide connection between the metal stud and the plastic parts by force or press fitting therebetween. Furthermore, it is an object of the present invention to provide a plastic clip that is pressed upon threads of the metal stud and rotatively removable therefrom.

In addition, it is an object of the present invention to provide a fastening system of the above type that uses inexpensive manufactured material parts, is simple to assemble and/or disassemble and is reliable in use.

BRIEF DESCRIPTION OF THE ACCOMPANYING DRAWINGS

Additional advantages and features of the present invention will become apparent from the subsequent description, taken in conjunction with the accompanying drawings, wherein:

FIG. 6A is a top plan view of the plastic clip of FIG. 6B showing a slot in the top thereof;

FIG. 6B is an exploded side view, partly in section, showing a second embodiment of the fastening system of the present invention;

FIG. 7 is a side view, partly in section, of the second embodiment of the fastening system of the present invention of FIG. 6B;

FIG. 8 is the view shown in FIG. 7 with the plastic clip removed from and disposed above the fastening system;

FIG. 9A is a top plan view of the plastic clip of FIG. 9B showing a hexagonal head formed thereon;

FIG. 9B is an exploded side view, partly in section, showing a third embodiment of the fastening system of the present invention;

FIG. 10 is a side view, partly in section, of the third embodiment of the fastening system of the present invention of FIG. 9B; and FIG. 11 is the view shown in FIG. 10 with the plastic clip removed from and disposed above the fastening system.

DETAILED DESCRIPTION OF THE INVENTION

Figure 1:
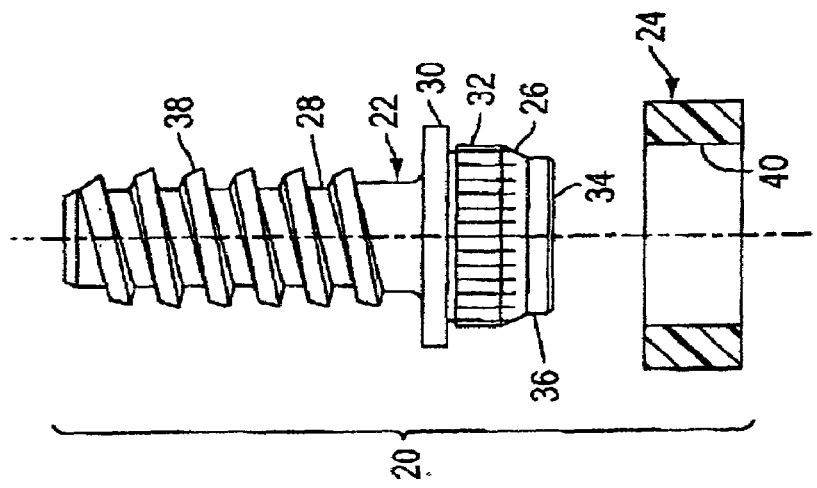
FIG. 1 is an exploded side view of one embodiment of the present invention including a connecting member having a metal stud and a plastic parent member.

With reference to the accompanying drawings, FIG. 1 shows a first embodiment of a connecting or fixed member 20, which is one of the parts of the present invention, and the member 20 includes two components, namely, a metal stud 22 and a plastic parent member 24. The metal stud 22, of suitable axial length, has a head 26 formed at one end thereof and a shank 28 which extends axially away from a flange 30 formed at the bottom of the head 26. The head has a circumferential knurl 32 that extends from the flange 30 in the opposite axial direction of the shank 28 and terminates a short distance from the flat top 34 of the head 26. The knurl 32 terminates in a radially inward portion which ends in a circular section 36 immediately below and having the same diameter as the flat top 34. The knurl 32 has a slightly larger diameter than the flat top 34, while the flange 30 has the largest diameter of the head 26. The shank 28 has a coarse thread 38 that extends from the bottom thereof toward the flange 30 and will terminate before reaching the flange 30. The thread is a well known shape that permits a suitable plastic member to be pressed thereon and forced into engagement therewith to be affixed to the metal stud 22 in a manner as set forth more fully hereinafter. The plastic parent member 24 will have a hole 40 with a diameter slightly smaller than the diameter of the knurl 32 and is adapted to be affixed to the head 26 in any suitable manner, such as by press-fit or the like, using conventional assembly equipment (not shown), as will be described more fully hereinafter. The plastic parent member 24 may carry or be part of any other components (not shown) of the assembly which are to be carried by or connected to other parts of the present invention and, instead of being shown in the form of a sleeve member, it may have been shown in the form of a plate member.

Figure 2:
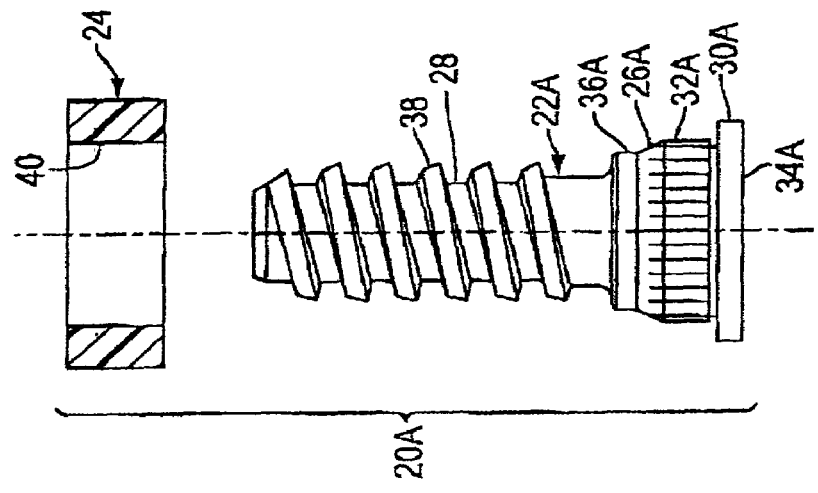
FIG. 2 is an exploded side view of a second embodiment of the present invention including a connecting member having a metal stud and a plastic parent member.

FIG. 2 shows a second embodiment of the connecting or fixed member which is designated 20A, that is the same as the first embodiment of the connecting member 20, except that the construction of a head 26A has been reversed from the head 26. Member 20A, as noted above for member 20, is one of the parts of the present invention. Therefore, the reference characters of FIG. 2 will be the same as those used in FIG. 1 when the part is the same and, when the part is different, as like the head 26A and the metal stud 22A, it will be given the added element "A". Another difference worth mentioning is the plastic parent member 24, shown in FIG. 2 of the second embodiment of the connecting member 20A, will be passed over the threaded shank 28 of the metal stud 22A before being affixed to the knurl 32A, because the flange 30A which is formed at the top 34A of the head 26A will engage the plastic parent member 24 and prevent further movement thereof. Other than that, the second embodiment of the connecting member 20A will have the same structural component which will operate in substantially the same manner as those shown and described for the first embodiment of the connecting member 20, set forth in FIG. 1, which will be discussed and shown more fully hereinafter. Note that the top 34A has the same diameter as that of the flange 30A and is the largest diameter of the head 26A, while knurl 32A is of an intermediate size diameter, and the circular section 36A adjacent the shank 28 has the smallest diameter.

Figure 5:
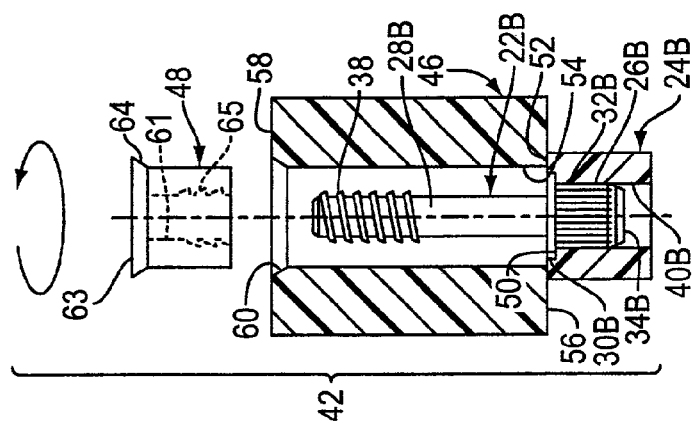
FIG. 5 is the view shown in FIG. 4 with the plastic clip removed from and disposed above the fastening system.
Figure 4:
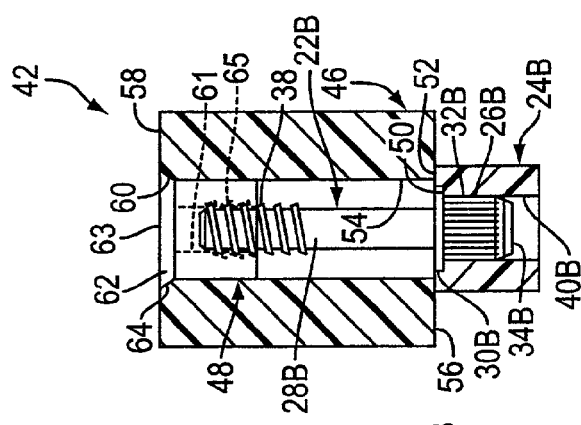
FIG. 4 is a side view, partly in section, of the first embodiment of the fastening system of the present invention of FIG. 3B.
Figure 3B:
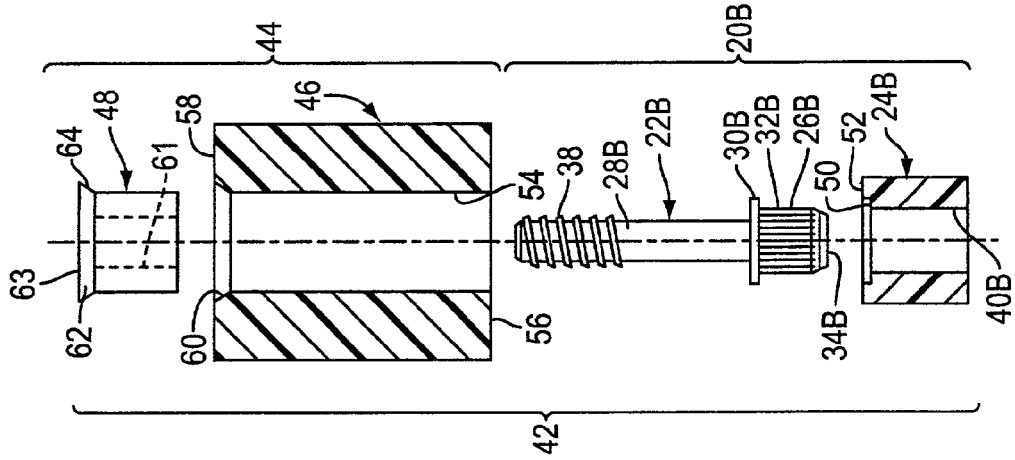
FIG. 3B is an exploded side view, partly in section, showing a first embodiment of the fastening system of the present invention.
Figure 3A:
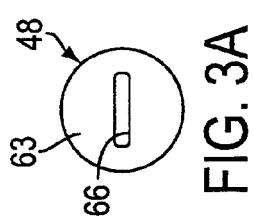
FIG. 3A is a top plan view of the plastic clip of FIG. 3B showing a slot in the top thereof.

Turning now to FIGS. 3B, 4 and 5, showing the first embodiment of the present invention in which a fastening system 42 is depicted, FIG. 3B shows the connecting member 20 made up of the metal stud 22B and the plastic parent member 24B, and a connected member 44 made up of a plastic member 46 and a clip 48. Once again, though the plastic member 46 is shown in the form of a sleeve member, it could have been shown in the form of a plate member. The hole 40B of the plastic parent member 24B is counterbored at 50 at the top end 52 thereof facing the head 26B with the counter bore 50 sized to receive the flange 30B therein. Both the metal stud 22B and the plastic parent member 24B are axially longer than their FIG. 1 counterparts and have been given the letter suffix "B". The plastic member 46 is thick and has a substantial axial length. The plastic member 46 has a through bore 54 that extends from a bottom end 56 to a top end 58. The diameter of the bore 54 is larger than the diameter of the flange 30B, but smaller than the top end 52 of the plastic parent member 24B. Of course, the diameter of the bottom end 56 is larger than the diameter of the top end 52 of the plastic parent member 24B. Also, the axial length of the shank 28B of the metal stud 22B is shorter than the axial length of the bore 54 of the plastic member 46 and, as shown in FIG. 4, its free end terminates below a top end 58 thereof. The top end 58 of the plastic member 46 has an inwardly biased counterbore 60 that terminates at the bore 54. The plastic clip or nut 48 has an outer diameter substantially equal to the diameter of the bore 54, and has an internal bore 61 which terminates at a conical flange 62 which encloses the upper end 63 and below which is a short flared inward portion 64 sized to fit within the counterbore 60 so that, when the clip 48 is connected to the metal stud 22, as shown in FIG. 4, the clip 48 will be wholly disposed in the bore 54 and the top end 63 of the clip 48 will lie in the same plane as that of the end 58 of the plastic member 46, as is shown in FIG. 4. When the clip 48 is forced downwardly, as shown in FIGS. 3B and 4, upon the metal stud 22 after it has been ultrasonically or thermally assembled so that its bore 61 whose diameter is equal to or slightly smaller than the diameter of the shank 28 of the metal stud 22. In a manner well known in the prior art, the threads 38 of the shank 28 have been shaped to readily receive the treated plastic clip 48 and the bore 61 thereof will be engaged on and assume the shape of the threads 38 so that upon the plastic material of the clip 48 cooling it will set to substantially form internal threads 65, as best shown in FIG. 5, which correspond to the threads 38 of the shank 28. This connection is made with the end of the shank 28B substantially below the bottom of the conical flange 62 of the clip 48. This serves to complete the assembly of the fastening system 42 with enough retaining force that the parts remain in assembled position with the connected member 44 interconnected to the connecting member 20. For purposes of disassembly, the conical flange 62 at its upper end 63, shown only in FIG. 3A, has a central slot 66 to receive the slotted end of a screwdriver (not shown) to allow removal of the clip 48 via rotation of the plastic clip 48 in a counter-clockwise direction from the metal stud 22B as is shown in FIG. 5.

The fastening system 42 is assembled by first forming the connecting member 20B in which the plastic parent member 24B is affixed to the metal stud 22B by being press-fitted to the head 26B thereof (see FIG. 4). Thereafter, the shank 28B of the metal stud 22B is disposed in the bore 54 of the plastic member 46. The top end 52 of the plastic parent member 24B engages the end 56 of the plastic member 46 when the metal stud 22B has been fully inserted. The free end of the shank 28B of the metal stud 22B will remain well below the top end of the plastic member 46. The clip 48 is axially aligned with the shank 28B of the metal stud 22B and having been previously ultrasonically or thermally assembled by equipment (not shown) onto the threads 38 of the metal stud 22B, to be connected thereto and complete the assembly of the fastener system 42, as is shown in FIG. 4.

Once the fastening system 42 has been assembled, the shank 28B of the metal stud 22B is disposed in the bore 54 in a relatively non-rotatable position therein. However, this is not the case for the clip 48 which, by engagement of a screwdriver in the slot 66, is easily rotated and, as shown in FIG. 5, by counter-clockwise rotation, will be removed from engagement with the threads 38 of the metal stud 22B. Thus, the fastening system 42 can be quickly disassembled and, thereafter, is quickly reusable by reconnection of the clip 48. While automatic equipment (not shown) can provide for the assembly operation, such equipment is not needed to disassemble any part or the whole of the assembled fastening system 42 which, as shown and described above, can be taken apart with a screwdriver. Thus, the clip 48 need only be treated ultrasonically or heated to aid in the press on installation thereof. Thereafter, the clip 48 has its threaded portion "set" and may be easily removed or reattached to the threads 38 of the metal stud 22B, as desired.

The second embodiment of the present invention is shown in FIGS. 6A, 6B, 7 and 8, wherein the fastening system 42A is substantially the same in structure, function and operation as the first embodiment of the invention shown and described hereinbefore, except that the plastic member 46A is of intermediate axial length, but still sufficient to wholly receive the clip 48 therein. However, because it is of shorter axial length, a metal stud 22B, also of shorter axial length, has been used. Accordingly, when one or more of the same parts are shown, they will have the previous reference characters (with or without a suffix) and when a different part is shown, it will have a different suffix which has been advanced by one letter, i.e. if the original part was 100, the different part will be designated 100A, etc. Accordingly, like parts have retained the original reference characters used previously in the first embodiment of the present invention. Likewise, since the second embodiment of the present invention has substantially the same structure, function and operation as that described for FIGS. 3A, 3B, 4 and 5, it will not be repeated herein, but reference may be had to that description for a more complete understanding of the second embodiment of the present invention.

The third embodiment of the present invention will be shown and described under FIGS. 9A, 9B, 10 and 11, wherein reference characters for the parts previously shown and described for the first and second embodiment of the present invention have used whole numbers, with and without suffixes. Those shown and only those parts which have been changed in the third embodiment of the present invention will use a whole number with a suffix that is advanced by one letter, so that if no suffix was previously used, the suffix "A" will be used and if the suffix "A" had previously been used, the new suffix will be "B", etc., etc., etc.

Accordingly, the connecting member 20C has the plastic parent member 24B affixed upon the knurl 32B of the head 26B in the same manner as shown and described hereinbefore. However, the shank 28C of the metal stud 22C is the same axial length as that shown in FIG. 6B, which has an axial length more than twice that of the relatively thin plastic member 46B through which it will extend, so that more than one-half of its axial length extends beyond the top end 58 of the plastic member 46B. The head 26B of the metal stud 22C at the underside of the flange 30B is set into the plastic parent member 24B at the same elevation as that of the top end 52 of the plastic parent member 24B, which is engaged with the bottom end 56 of the plastic member 46B. Thus, the length of the shank 28C above the flange 30 will extend through and above the thin plastic member 46B for a slightly greater distance than the axial length of the plastic member 46B. Accordingly, the threads 38 of the shank 28C will extend through the bore 54B with no engagement therebetween. The clip 48A will be pressed into engagement with the threads 38 of the shank 28C externally of the bore 54B. The clip 48A has a central axial bore 61 therein which is similar to the bore 61 of the clip 48 shown in FIG. 6B, except that the clips 48 and 48A are substantially different. The clip 48A has a hexagonal external surface 67 that is suitable to be engaged by a wrench (not shown) for axial rotation upon the threads 38 in a conventional manner for removal and/or reengagement (see FIG. 11). The bottom of the hexagonal surface 66 terminates in a flange 68 which has a larger diameter than the diameter of the bore 54B so as to act as a stop to complete the assembly of the fastening system 42B.

Once the metal stud 22C has been inserted into the bore 54B of the plastic member 46B, the connecting member 20C will engage the connected member 44B at the bottom end 56 of the plastic member 46B. This leaves the end of the shank 28C which extends beyond the top end 58 of the plastic member 46B an axial distance substantially less than the axial length of the clip 48A when the clip 48A is press-fitted downwardly upon the threads 38 of the metal stud 22C by suitable equipment (not shown) with the downward motion is set to cease upon engagement between the clip 48A and top end 58 of the plastic member 46B. To aid in the press-fit between the clip 48A and the threads 38 of the shank 28C of the metal stud 22C, the clip 48A may have been ultrasonically or thermally assembled by suitable equipment (not shown) prior to engaging the metal stud 22C. This will effect completing the assembly of the fastening system 42B by connecting the connecting member 20C and the connected member 44B to each other as is shown in FIG. 10. Thereafter, the clip 48A may be rotatively removed from the metal stud 22C by a wrench or other suitable means to disassemble the connected member 44B from the connecting member 20C (see FIG. 11). Of course, the fastening system 42B may be readily reassembled by rotatively reconnecting the plastic clip 48B to the metal stud 22A.

Thus, regardless of the relative thickness of the plastic member used in the fastening system, whether the plastic member is 46 or 46A or 46B, through the use of an appropriate length metal stud, whether it be 22B for the plastic member 46, or 22C for the plastic members 46A or 46B, the plastic clip 48 for the plastic member 46 and 46A, or the plastic clip 48A for the plastic member 46B will be used to complete the assembly of the fastening system 42, 42A or 42B, respectively by having the clip 48 or 48A press-fitted onto the threads 38 of the metal stud 22B or 22C for quick attachment thereto. The plastic clip 48 or 48A once connected to the threads 38 of the metal stud 22B or 22C, respectively, is best rotatively removed by use of a suitable tool, be it a screwdriver for the plastic clip 48, or a wrench for the plastic clip 48A to disassemble the fastening system 42, 42A or 42B. Thereafter, the fastening system 42, 42A or 42B may be reassembled by the plastic clip 48 or 48A being rotatively reconnected to the metal stud 22B or 22C, respectively.

In addition to connecting the connecting member 20 or 20A made up of single members affixed to each other to the connected member 44, 44A or 44B also made up of single members interconnecting members 20B or 20C it is possible to include multiple parts (not shown) in the various fastening systems 42, 42A or 42B. Also, the plastic members 46, 46A or 46B may be plastic sheet members, as desired. Lastly, the connecting members 20 and 20A, shown and described in FIGS. 1 and 2, respectively, may be used with any of the fastening systems 42, 42A or 42B of the present invention by suitably adjusting the diameters and/or axial lengths of the parts thereof.

Figure 12:
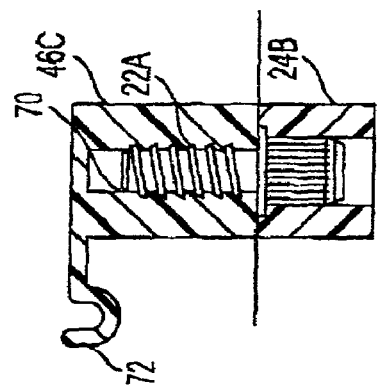
FIG. 12 is a side view, partly in section, of a fourth embodiment of the fastening system of the present invention.

The fourth embodiment of the present invention will be shown and described under FIG. 12, wherein reference characters for the parts previously shown and described for the other embodiments of the present invention have used whole numbers, with and without suffixes. Any new or changed components will use new whole numbers or whole numbers with a suffix that is advanced by one letter as was previously described.

Accordingly, it will be noted that the plastic member 46C includes an integrally formed clip therein so that the metal stud 22A can be connected directly into the opening 70 therein, and thus affix the plastic parent member 24B to the plastic member 24C. The disassembly can be as described before or by suitable rotation of either of the members 24B or 46C or in any other suitable manner. Also, there is component connector 72 to which one or more components (not shown) may be connected in any conventional manner, as is well known in the prior art. It will be understood that, though plastic member 46C is shown with an integrally formed component member 72, any other suitable plastic member having an integrally formed opening 70 used to connect a plastic member (41C) to a plastic parent member (24B) via a metal stud (22A) could have been illustrated, both with and without additional components.

In general, the above identified embodiments are not to be construed as limiting the breadth of the present invention. It will be understood that modifications or other alternative constructions may become apparent within the scope of the invention as defined in the appended claims.

What is claimed is:

1. A fastening system comprising:
   a. a plastic member having a bore therein;
   b. a metal stud having a head and a shaft extending therefrom, the shaft having a thread formed thereon and the head having a knurl about its outer circumference, the shaft being disposed into the bore;
   c. a plastic parent member affixed to the head by engagement with the knurl thereof; and
   d. a plastic clip including means for being connected to the threads of the shaft by pushing the clip onto the shaft to engage the threads and allowing the clip to be rotatively removable therefrom the plastic clip is disposed in the bore to removably engage the shaft of the stud.

2. The combination claimed in claim 1 wherein:
a. the plastic parent member is disposed outwardly of the bore and in contact with the plastic member.

3. The combination claimed in claim 2 wherein:
a. an annular flange is formed to extend radially outwardly from one end of the knurl of the head of the stud; and
b. the flange contacts the plastic member to limit the axial engagement between the stud and the plastic member.

4. The combination claimed in claim 3 wherein:
a. the annular flange is formed at the top of the head.

5. The combination claimed in claim 3 wherein:
a. the annular flange is formed at the bottom of the head.

6. A fastening system comprising:
a. a plastic member having a bore therein;
b. a metal stud having a head and a shaft with threads thereon;
c. a plastic parent member affixed to the head of the metal stud;
d. the shaft is disposed into the bore of the plastic member; and
e. a plastic clip configured to be pushed onto and connected to the threads of the shaft, the clip including means for allowing the clip to be rotatively removable therefrom the plastic clip is disposed in the bore to removably engage the shaft of the stud.

7. The combination claimed in claim 6 wherein:
a. the head of the metal stud is knurled; and
b. the plastic parent member engages the knurl to be joined to the head of the metal stud.

8. A fastening system for carrying a plastic parent member and to be removable attached by a plastic clip to a plastic member comprising:
a. a metal stud having a head to which the plastic parent member is connected and a shaft extends from the head with threads thereon;
b. the metal stud to be disposed in a bore of the plastic member; and
c. the metal stud to be connected to the plastic member, the plastic clip being configured to be pushed onto and connected to the threads of the shaft thereof, the clip including means for allowing the clip to be rotatively removable therefrom the plastic clip is disposed in the bore to removably engage the shaft of the stud.

9. The combination claimed in claim 8 wherein:
a. the head of the metal stud is knurled; and
b. the plastic parent member engages the knurl to be joined to the head of the metal stud.

* * * * *